United States Patent [19]
Wallman

[11] 4,289,028
[45] Sep. 15, 1981

[54] FUEL QUANTITY GAUGE
[75] Inventor: Irwin Wallman, Shelburne, Vt.
[73] Assignee: Simmonds Precision Products, Inc., Tarrytown, N.Y.
[21] Appl. No.: 107,679
[22] Filed: Dec. 27, 1979
[51] Int. Cl.[3] .............................................. G01F 23/26
[52] U.S. Cl. .................................................... 73/304 C
[58] Field of Search ...................................... 73/304 C
[56] References Cited
U.S. PATENT DOCUMENTS

| 3,161,054 | 12/1964 | Cohn | 73/304 C |
| 3,375,716 | 4/1968 | Hersch | 73/304 C |
| 3,638,491 | 2/1972 | Hart | 73/304 C |
| 3,747,407 | 7/1973 | Wallman | 73/304 C |

Primary Examiner—Gerald Goldberg
Assistant Examiner—Joseph W. Roskos
Attorney, Agent, or Firm—Edwin E. Greigg

[57] ABSTRACT

A capacitance type fuel quantity gauge for a fuel tank which includes a probe capacitor in the fuel tank having a capacitance which varies in accordance with the fuel level and connected by one conductor to the output of a Lo-Z oscillator, two oppositely polled diodes connected together and to the capacitor, the positive diodes connected by another conductor to a signal conditioner and the negative diode connected to the one conductor by an inductance, the one conductor connected to the oscillator output and to the signal conditioner by a capacitor and inductance, respectively, so that the one conductor carries both the Lo-Z signal and the DC negative signal.

5 Claims, 2 Drawing Figures

FUEL QUANTITY GAUGE

BACKGROUND OF THE INVENTION

In a present day DC fuel quantity gauge system as used on aircraft and the like, wherein a probe capacitor is used to sense the fuel level in the fuel tank, the common practice is to provide three conductors in the aircraft wiring between the tank unit and the signal conditioner by means of which the output signal from the tank unit is processed to indicate the quantity of fuel in the tank. One type of fuel quantity gauge system in current use today is shown in U.S. Pat. No. 3,747,407, entitled Probe Mounted Electronics for a Fuel Gauge System, issued July 24, 1978, to Irwin Wallman, the applicant herein. In such a fuel quantity gauge system, one of these conductors is used to conduct the AC voltage signal from signal generating means such as a Lo-Z oscillator to the probe capacitor and the other two lines for the DC negative and positive return signals fed to the signal conditioner. As is well known, weight is a major consideration in an aircraft structure and any weight saving in an aircraft is an on-going effort. Obviously, even a saving in aircraft wiring without a reduction in function is viewed as highly desirable not only from the weight standpoint, but from the cost standpoint as well.

OBJECTS AND SUMMARY OF THE INVENTION

Accordingly, a primary object of this invention is to provide a new and novel DC fuel quantity gauge system for an aircraft.

Another object of this invention is to provide a new and novel DC fuel quantity gauge system for an aircraft which permits a reduction in the wiring in such a system thereby producing both a weight and cost saving.

A further object of this invention is to provide a new and novel DC fuel quantity gauge system of the capacitance type which permits the multiplexing of the Lo-Z AC voltage signal line and one of the DC output signal return lines thereby providing a saving in aircraft wiring for such a system of between 33 and 43 percent depending upon the Lo-Z rates and switching requirements.

A still further object of this invention is to provide a new and novel DC fuel quantity gauge system for an aircraft which permits the multiplexing of the functions of both the AC signal voltage generator and one of the DC return lines in a single multiplexing network regardless of the number of probe capacitors utilized in the aircraft fuel tank.

The objects of the invention and other related objects are accomplished by the provision of a probe capacitor disposed within the fuel tank having a capacitance which varies in accordance with the level of fuel in the tank. Means are provided for generating an AC voltage which is applied through a first conductor to one side of the probe capacitor and a pair of oppositely poled diodes are connected at their input sides to the other side of the probe capacitor. A second conductor is provided for connecting the output side of one of the diodes to a signal processing means which provides an indication of the quantity of fuel in the tank. The output sides of the diodes are connected together by DC blocking means and the output side of one of the diodes is connected to the first conductor through AC blocking means. The first conductor is connected to the output of the signal processing means through DC blocking means and to the signal processing means through AC blocking means whereby the AC signal voltage and the DC return signal voltage are multiplexed on the first conductor so that only two conductors are required in the gauge.

The invention will be better understood as well as further objects and advantages thereof become more apparent from the ensuing detailed description taken in conjunction with the drawing.

DESCRIPTION OF THE PREFERRED EMBODIMENT

Figure 1:
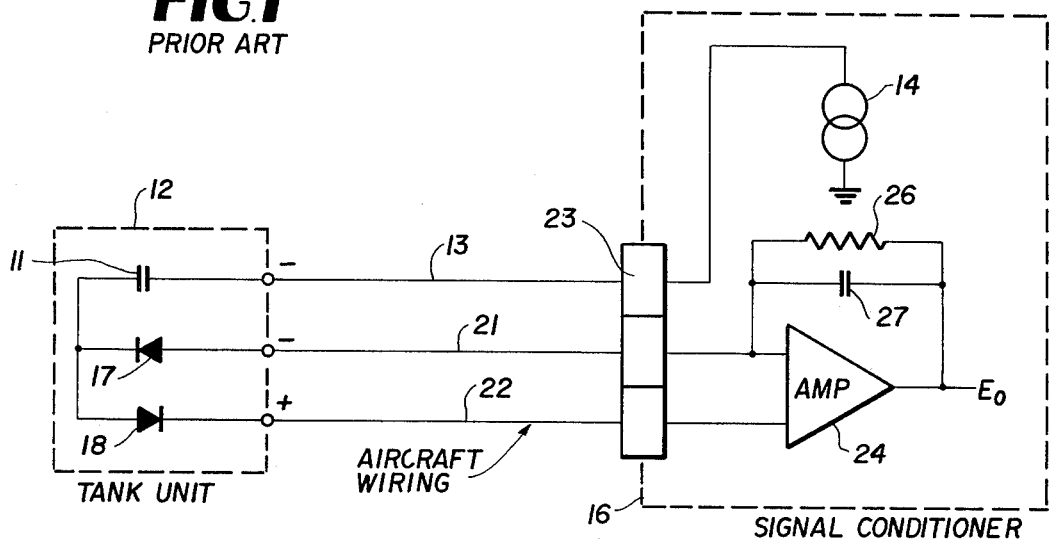
FIG. 1 is a schematic wiring diagram of the prior art DC fuel quantity gauge system.

Referring now to FIG. 1, there is shown a schematic wiring diagram of a capacitive-type fuel quantity gauge system in present use today. Such a system as shown in FIG. 1 utilizes the principle set forth in the aforementioned patent.

The fuel quantity gauge comprises a tank unit and a signal conditioner.

The system of FIG. 1 utilizes a probe capacitor 11 of a tank unit 12 which is suitably disposed in a fuel tank so that its capacitance varies with the level of fuel in the tank. One side of the probe capacitor 11 is connected by means of conductor 13 to the output of an AC voltage source such as a Lo-Z oscillator 14 arranged at a remote location. Preferably, the oscillator 14 is assembled with the component parts comprising a signal conditioner 16 by means of which the output signal determined by the capacitance of capacitor 11 is amplified and processed into a signal $E_o$ for translation into a readout on a suitable indicator, or the like, which indicates the level of fuel in the tank.

The prior art system of FIG. 1 includes a pair of oppositely poled diodes 17, 18 the cathode of diode 17 and the anode of diode 18 being connected to the opposite side of the probe capacitor 11 from that of the conductor 13. A pair of conductors 21, 22 are connected at one end to the anode of diode 17 and the cathode of diode 18 which conductors form the negative and positive DC return lines from the tank unit 12 as is well known. The opposite ends of conductor 21, 22 are connected to the two inputs respectively, preferably through a terminal block 23 to an amplifier 24 on the signal conditioner 16. The output of the amplifier 24 provides the output signal $E_o$ and the amplifier 24 includes a conventional feedback system comprising a resistor 26 and a capacitor 27. The amplifier 24 and its feedback resistor 26 and capacitor 27 comprise a signal conditioner producing the output $E_o$. Thus, the prior fuel quantity gauge system of FIG. 1 utilizes three conductors, 13, 21 and 22 which together form the wiring for the unit which extends throughout the device such as an aircraft on which the fuel quantity gauge system of FIG. 1 is installed.

Figure 2:
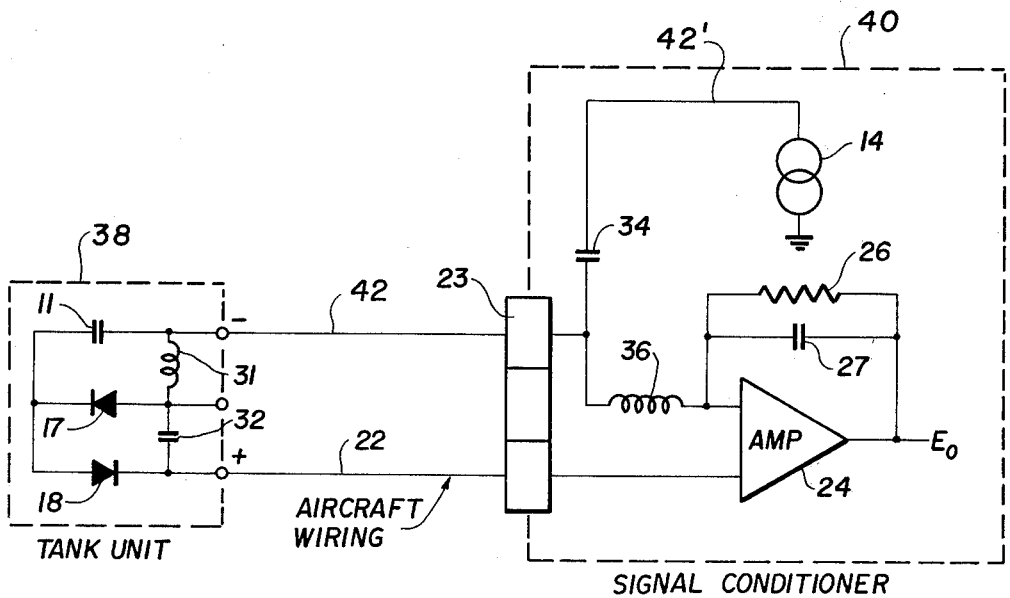
FIG. 2 is a schematic wiring diagram of the DC fuel quantity gauge system of the invention.

Referring now to FIG. 2 wherein like numerals are utilized to identify like parts, there is shown the fuel quantity gauge system of the invention wherein the conductor 13 and one of the DC return conductors are multiplexed from the tank unit 38 to the signal conditioner 40, which in the illustrated embodiment comprises the elimination of the DC negative return conductor so that a conductor 42 is utilized for both the Lo-Z AC voltage and the DC negative return voltage.

In accordance with the invention, the return current from the negative diode 17 is coupled into the conductor 42 by means of AC blocking means, such as an inductance 31 connected between the anode of diode 17 and the side of capacitor 11 to which conductor 42 is connected. Also, the DC positive return line 22 is provided with DC blocking means, such as a capacitor 32 connected between the cathode of diode 18 and the anode of diode 17 in the tank unit 12. As an example of the values for the inductance 31 and capacitor 32, the inductance 31 may have a value of 100 millihenries and the capacitor 32 may have a value of 1 uf. The impedance of inductance 31 must be much larger than the impedance of capacitor 32 to keep both diode outputs at ground. A 1000:1 ratio would require inductance 31 to be 700 mhy.

The coupling means for the AC and DC voltages in the signal conditioner 40 are also provided in the circuit of FIG. 2 and, in the illustrated embodiment, a capacitor 34, connected to the output of oscillator 14, is disposed within the portion of a conductor extension 42' of the conductor 42 extending within the signal conditioner 40 thereby providing DC blocking means for the DC negative return current on line 42' to the oscillator 14. The Lo-Z AC voltage in the signal conditioner 40 on the conductor extension 42' is isolated from the amplifier 24 by means of an inductance 36 through which that portion of line 42' in its signal conditioner 40 is connected to the amplifier 24. Any DC voltage and DC current offset on the Lo-Z and DC negative return conductors are blocked from the Lo-Z oscillator 14 by means of the capacitor 34. If desired, the drop across capacitor 34 could be negated by detecting Lo-Z output for oscillator control loop.

It should also be understood that when more than one tank unit, that is, the capacitor 11 and diodes 17, 18 are used per tank, it is only necessary to include one inductance 31 and one capacitor 32 per tank rather than one in each tank unit.

What is claimed and desired to be secured by Letters Patent of the United States is:

1. A capacitance type fuel quantity gauge for a fuel tank, comprising in combination:

a tank unit, including: a probe capacitor, the capacitance of which varies in accordance with the fuel quantity gauged; a pair of oppositely poled diodes, each having a side connected to one side of the probe capacitor; AC blocking means connected to the opposite side of the probe capacitor and to the other side of one of the diodes; and DC blocking means connected between the other side of the diodes;

a signal conditioner, including: AC voltage source; signal processing means; DC blocking means connected to the AC voltage source and the signal processing means; and AC blocking means connected to the DC blocking means of the signal conditioner and to the signal processing means; and a conductor connected to the connection of the DC blocking means of the tank unit to one of the pair of diodes and to the signal processing means; and a multiplexing conductor connected to the connection of the AC blocking means of the tank unit to the opposite side of the probe capacitor and to the AC blocking means and DC blocking means of the signal conditioner, whereby the AC signal voltage from the AC signal source and the DC signal return voltage from of the diodes are carried by the multiplexing conductor.

2. The capacitance type fuel quantity gauge for a fuel tank as defined in claim 1, wherein the AC blocking means connected to the opposite side of the probe capacitor and to the other side of one of the diodes comprises an inductor.

3. The capcitance type fuel quantity gauge for a fuel tank as defined in claim 2, wherein the DC blocking means connected between the other side of the divider comprises a capacitor.

4. The capacitance type fuel quantity gauze for a fuel tank as defined in claim 1, wherein the AC blocking means connected to the DC blocking means of the signal conditioner and to the signal processing means comprises an inductor.

5. The capacitance type fuel quantity gauge for a fuel tank as defined in claim 4, wherein the DC blocking means connected to the AC voltage source and the signal processing means comprises a capacitor.

* * * * *